US006075873A

United States Patent [19]
Kondou et al.

[11] Patent Number: 6,075,873
[45] Date of Patent: Jun. 13, 2000

[54] APPARATUS FOR ENTERING SORTING INFORMATION

[75] Inventors: Takahiko Kondou; Tadashi Ishikura; Tokihiko Fukumoto, all of Tokyo, Japan

[73] Assignee: NEC Corporation, Japan

[21] Appl. No.: 08/946,629

[22] Filed: Oct. 7, 1997

[30] Foreign Application Priority Data

Oct. 11, 1996 [JP] Japan .................................... 8-270049

[51] Int. Cl.$^{7}$ ........................................................ G06K 9/00
[52] U.S. Cl. ............................................ 382/101; 209/584
[58] Field of Search .................................... 382/101, 309, 382/311; 209/584, 900, 583, 587, 580, 938, 939; 705/401

[56] References Cited

U.S. PATENT DOCUMENTS

| | | | |
|---|---|---|---|
| 4,632,252 | 12/1986 | Haruki et al. | 209/584 |
| 4,992,649 | 2/1991 | Mampe et al. | 209/900 |
| 5,025,475 | 6/1991 | Okabe | 382/101 |
| 5,031,223 | 7/1991 | Rosenbaum et al. | 382/101 |
| 5,317,654 | 5/1994 | Perry et al. | 382/101 |
| 5,558,232 | 9/1996 | Stevens et al. | 209/584 |
| 5,697,504 | 12/1997 | Hiramatsu et al. | 209/584 |
| 5,794,789 | 8/1998 | Payson et al. | 209/584 |
| 5,810,174 | 9/1998 | Hamada et al. | 209/584 |
| 5,842,577 | 12/1998 | Stevens et al. | 209/583 |

FOREIGN PATENT DOCUMENTS

| | | | |
|---|---|---|---|
| 0148783 | 7/1985 | European Pat. Off. . | |
| 61-71877 | 4/1986 | Japan | B07C 3/18 |
| WO9012660 | 11/1990 | WIPO . | |

OTHER PUBLICATIONS

European Office Action dated Dec. 10, 1998.

*Primary Examiner*—Yon J. Couso
*Attorney, Agent, or Firm*—Ostrolenk, Faber, Gerb & Soffen, LLP

[57] ABSTRACT

An apparatus for entering sorting information has a plurality of sorting devices, a plurality of terminal devices, and a sorting-data distributing device. Each of the sorting devices photo-electrically recognizes sorting information in an image on a document and sorts the document using the recognized sorting information as sorting data. It supplies unrecognizable sorting data to the distributing device. Each of the terminal devices displays received unrecognized sorting data. An operator recognizes the sorting information corresponding to the displayed unrecognized sorting data and enters the recognized sorting information into the terminal device. The recognized sorting data is supplied to the distributing device. The distributing device is connected between the plurality of sorting devices and the plurality of terminal devices to receive and transfer the unrecognized sorting data to the one of the plurality of terminal devices that currently has the lowest load, and also to receive the recognized sorting data supplied from the terminal device and transfer the recognized sorting data to the sorting device which has supplied the unrecognized sorting data corresponding to the recognized sorting data. The distributing device includes a control unit, a plurality of input sections individually connected to the plurality of sorting devices, and a plurality of output sections individually connected to the plurality of terminal devices.

7 Claims, 3 Drawing Sheets

APPARATUS FOR ENTERING SORTING INFORMATION

BACKGROUND OF THE INVENTION

1. Field of the Invention

The present invention relates to an apparatus for entering sorting information, and more particularly to an apparatus for distributing unrecognizable sorting data to a plurality of devices for entering corrected sorting information.

2. Description of the Related Art

Sorting information concerned in the present invention is information or image data for machine sorting or classification of mail securities and so forth.

Sorting data is sometimes omitted erroneously written, or unclearly written, particularly in mails. It is a common practice that such faulty sorting data is manually rewritten using a device for entering corrected sorting information. A conventional apparatus for entering sorting image data or sorting information will be briefly explained below.

FIGS. 1A and 1B are block diagrams illustrating such a conventional apparatus for entering sorting information for mail. The apparatus shown in FIG. 1A includes mail sorting device 11, a distributing device for mail sorting data 12 and a plurality of terminal devices $\mathbf{13}_1$ to $\mathbf{13}_N$ (N=1, 2, 3, . . . ) for entering mail sorting data.

The mail sorting device 11 optoelectronically reads sorting data such as zip codes or address codes of supplied mail and sorts the sorting data.

Unrecognizable sorting data which cannot be recognized by the mail sorting device 11 are recognized by an operator, who then enters his recognized sorting data into the terminal devices $\mathbf{13}_1$ . . . $\mathbf{13}_N$.

The distributing device 12 is provided with general control unit 15 and output sections $\mathbf{17}_1$ to $\mathbf{17}_N$ connected to terminal devices $\mathbf{13}_1$ to $\mathbf{13}_N$, respectively. General control unit 15 controls output sections $\mathbf{17}_1$ to $\mathbf{17}_N$. Each of output sections $\mathbf{17}_1$ to $\mathbf{17}_N$ sends sorting data (image data) supplied from mail sorting device 11 to a corresponding one of terminal devices $\mathbf{13}_1$ to $\mathbf{13}_N$. Terminal devices $\mathbf{13}_1$ to $\mathbf{13}_N$ receive unrecognized sorting data, enable the operater to replace data with the operator's recognized sorting data and send the rewritten sorting data to general control unit 15, which sends in turn the sorting data to mail sorting device 11.

As shown in FIGS. 1A and 1B, the conventional apparatus for entering sorting information may include a plurality of mail sorting devices, for example 11 and 11'. In this case, distributing devices 12 and 12' are connected to the plurality of mail sorting devices 11 and 11', respectively, and a plurality of (N) terminal devices $\mathbf{13}_1$ to $\mathbf{13}_N$ and another plurality of (N') terminal devices $\mathbf{13'}_1$ to $\mathbf{13'}_N$ are connected to the plurality of distributing devices 12 and 12'. It is to be noted that the mail sorting devices 11, 11' have individual respective distributing devices 12 and terminal devices $\mathbf{13}_1$ to $\mathbf{13}_N$ and distributing devices 12' and terminal devices $\mathbf{13'}_1$ to $\mathbf{13'}_N$ connected thereto.

As a concrete example of the prior art, an invention of a sorting-information entering apparatus for mail is described in Japanese Patent Laid-open No. 71877/86 (inventors Tamata et al.). The coding device which characterizes the invention of Tamata et al. includes a supply section (corresponding to mail sorting device 11 of FIG. 1A) and a plurality of desk (each corresponding to the mail sorting-data distributing device 12 and one mail terminal device for entering sorting data $\mathbf{13}_1$ to $\mathbf{13}_N$ shown in FIG. 1A).

The apparatus of Tamata et al. optically converts density data in a sorting image of a letter or the like, recognizes sorting data, and sorts the mail. If the sorting data is unrecognizable, i.e., the sorting image is faulty, the sorting data is supplied to the supply section.

The coding desk supplied with unrecognizable image data from the supply section displays the faulty image data on an image display unit or the like so that an operator may recognize the sorting information. The operator enters his recognized image data, the correct sorting information, into the coding desk.

In the apparatus for entering sorting information described above, a plurality of coding desks is connected to a single supply section. When an optically unreadable zip code is supplied to the supply section, sorting information is manually entered using the plurality of the coding desks provided in the apparatus for entering sorting information.

The first problem encountered in the prior art apparatus shown in FIGS. 1A and 1B is that, when another mail sorting device such as the second mail sorting device 11 is added, the number of associated devices and the installation area of the entire apparatus are significantly increased.

This problem originates from the fact that a plurality of distributing devices 12 and a corresponding plurality of terminal devices $\mathbf{13}_1$ to $\mathbf{13}_N$ are required for every mail sorting device 11. Accordingly, if mail-sorting devices 11 are added, then distributing devices 12 as well as terminal devices $\mathbf{13}_1$ to $\mathbf{13}_N$ must be additionally provided in proportion to the number of mail-sorting devices 11.

A second problem encountered is that, where a plurality of mail-sorting devices 11, 11' are operating, unevenness in load is likely to take place among the pluralities of terminal devices $\mathbf{13}_1$ to $\mathbf{13}_N$ and $\mathbf{13'}_1$ to $\mathbf{13'}_N$. For example, if the load on a certain one of mail-sorting devices 11 happens to increase, the loads on terminal devices $\mathbf{13}_1$ to $\mathbf{13}_N$ connected to the mail-sorting device 11 increase. If the load on another of the mail-sorting devices 11' happens to decrease on the contrary, the loads on terminal devices $\mathbf{13'}_1$ to $\mathbf{13'}_N$ connected thereto decrease.

Similar problems exists in the case of the Tamata et al. apparatus.

The reason for this occurrence of uneven loads is in that, since each set of terminal devices $\mathbf{13}_1$ to $\mathbf{13}_N$ is connected exclusively to one mail sorting device, the load on each respective set of the terminal devices depends upon the load on the corresponding mail sorting device.

SUMMARY OF THE INVENTION

In view of the above-described problems, it is an object of the present invention to provide an apparatus for entering corrected sorting information when unrecognizable sorting data supplied from a plurality of mail-sorting devices are distributed to a plurality of terminal devices, which is operable to distribute even loads on the terminal devices.

According to the present invention, the apparatus for entering sorting-information comprises: a plurality of sorting devices each for photo-electrically recognizing sorting information of an image marked on a document and sorting the document using the recognized sorting information as sorting data and supplying unrecognizable sorting information as unrecognized sorting data therefrom; a plurality of terminal devices for entering sorting data, each for displaying received unrecognized sorting data so that an operator may recognize the sorting information corresponding to the displayed unrecognized sorting data and for entering the sorting information recognized by the operator, as recognized sorting data, into the terminal device for entering sorting data of concern and transmitting the recognized sorting data therefrom; and a sorting-data distributing device, connected between the plurality of sorting devices and the plurality of terminal devices for entering sorting data, to receive and transfer the unrecognized sorting data to one of the plurality of the terminal devices for entering sorting data, and also to receive the recognized sorting data transmitted from said terminal device for entering sorting data of concern and transfer these data to the sorting device which has supplied the unrecognized sorting data corresponding to the recognized sorting data.

The sorting-data distributing device includes a control unit, a plurality of input sections individually connected to the plurality of sorting devices, and a plurality of output sections individually connected to the plurality of terminal devices for entering sorting data.

The control unit controls the input sections to receive the unrecognized sorting data, selects an output section to receive the unrecognized sorting data from the input section, and controls the selected output section to transfer the unrecognized sorting data to a connected terminal device for entering sorting data.

The control unit preferably selects, as an output section to receive the unrecognized sorting data, an output section connected to the terminal device having a low load, and controls the selected output section to send the unrecognized sorting data to the terminal device connected thereto.

The transmission of said recognized sorting data from the terminal device of concern to the sorting-data distributing device can be used to serve as an input request notifying the control unit that the terminal device of concern is in a lower load state. The control unit interprets the lower load state as a waiting state for an input of the next unrecognized sorting data.

It is also preferred that a request for an input of the next unrecognized sorting data is transmitted to the control unit from the terminal device of concern at the same time as the transmission of the recognized sorting data from the terminal device of concern to the sorting-data distributing device.

When a plurality of said unrecognized sorting data are supplied at the same time from a plurality of said sorting devices, a second one of said unrecognized sorting data (referred to as second data) other than one of the unrecognized sorting data that has been arbitrarily selected by said control unit (referred to as a first data) are temporarily stored in the input sections individually connected to the sorting devices which have supplied the second data. The first data is first sent to a lowest-loaded terminal device under the control of the control unit, and thereafter the other unrecognized sorting data, the second data, are sent one by one to the terminal devices in an increasing order of the load levels.

When the recognized sorting data is sent from the terminal device to the sorting device, the data is preferably transmitted via the control unit.

In order to ensure parallel operations between supplying of unrecognized sorting data from sorting devices to terminal devices and sending of recognized sorting data from terminal devices to sorting devices, the outgoing signal paths followed by the unrecognized sorting data from the sorting devices to the terminal devices are constructed separately from the returning signal paths of the recognized sorting data from the terminal devices to the sorting devices.

Since all the sorting devices are connected to the single sorting-data distributing device in this manner, the sorting information unrecognized by the plurality of sorting devices can all be sent to the single sorting-data distributing device. Furthermore, since the single sorting-data distributing device is connected to all of the terminal devices, unrecognized sorting data in the sorting-data distributing device can be transferred to any desired one of the terminal devices.

In other words, since the sorting-data distributing device is connected between all of the sorting devices and all of the terminal devices, unrecognized sorting data can be sent from any sorting device to any desired one of the terminal devices.

Further, since the sorting-data distributing device includes the general control unit capable of controlling signal paths of the recognized sorting data from all of the terminal devices to any desired sorting device, recognized sorting data supplied from any of the terminal devices can be sent to any of the sorting devices via the general control unit of the sorting-data distributing device.

The above and other objects, features, and advantages of the present invention will become apparent from the following description based on the accompanying drawing which illustrates an example of a preferred embodiment of the present invention.

DETAILED DESCRIPTION OF THE PREFERRED EMBODIMENT

An embodiment of the present invention will be described below with reference to the drawings.

Figure 1A:
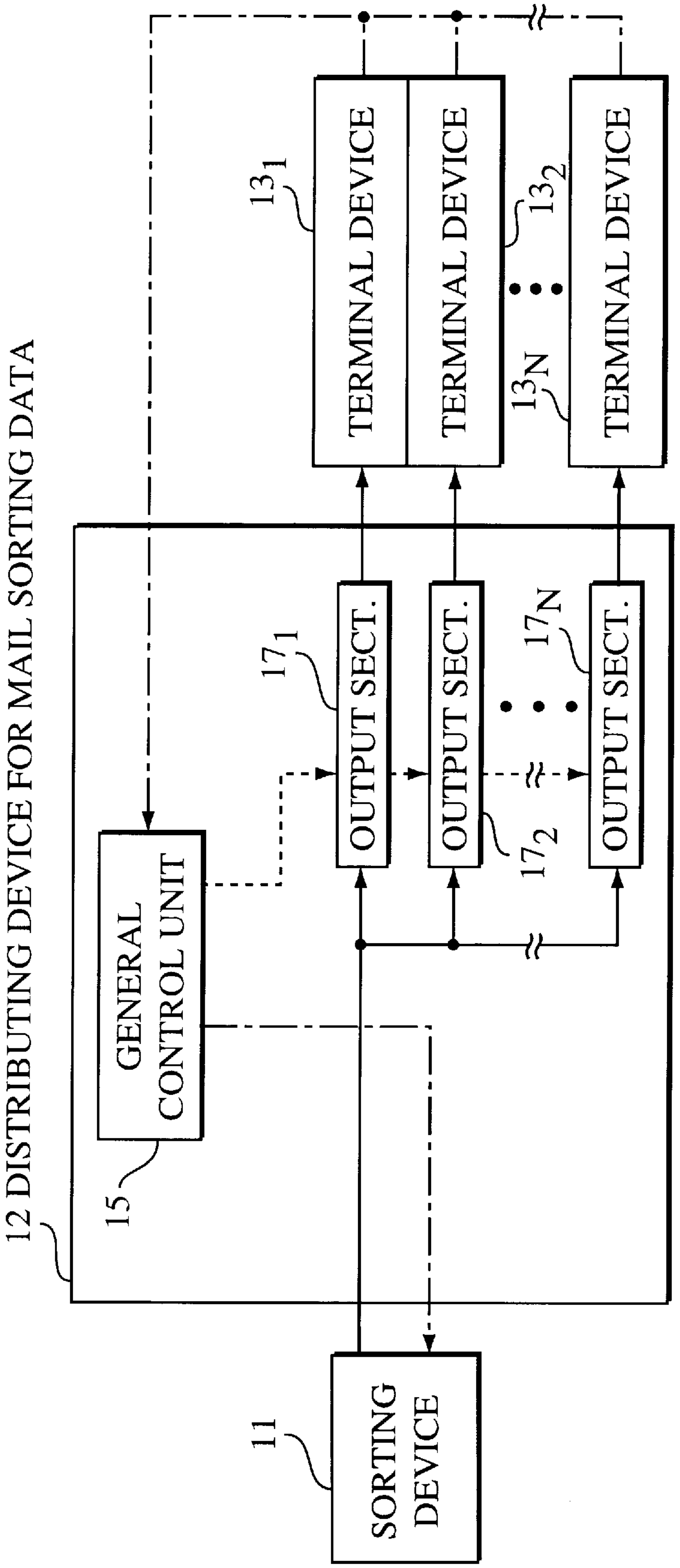
FIG. 1A PRIOR ART
FIGS. 1A and 1B are block diagrams showing a conventional apparatus for entering sorting information.
Figure 1B:
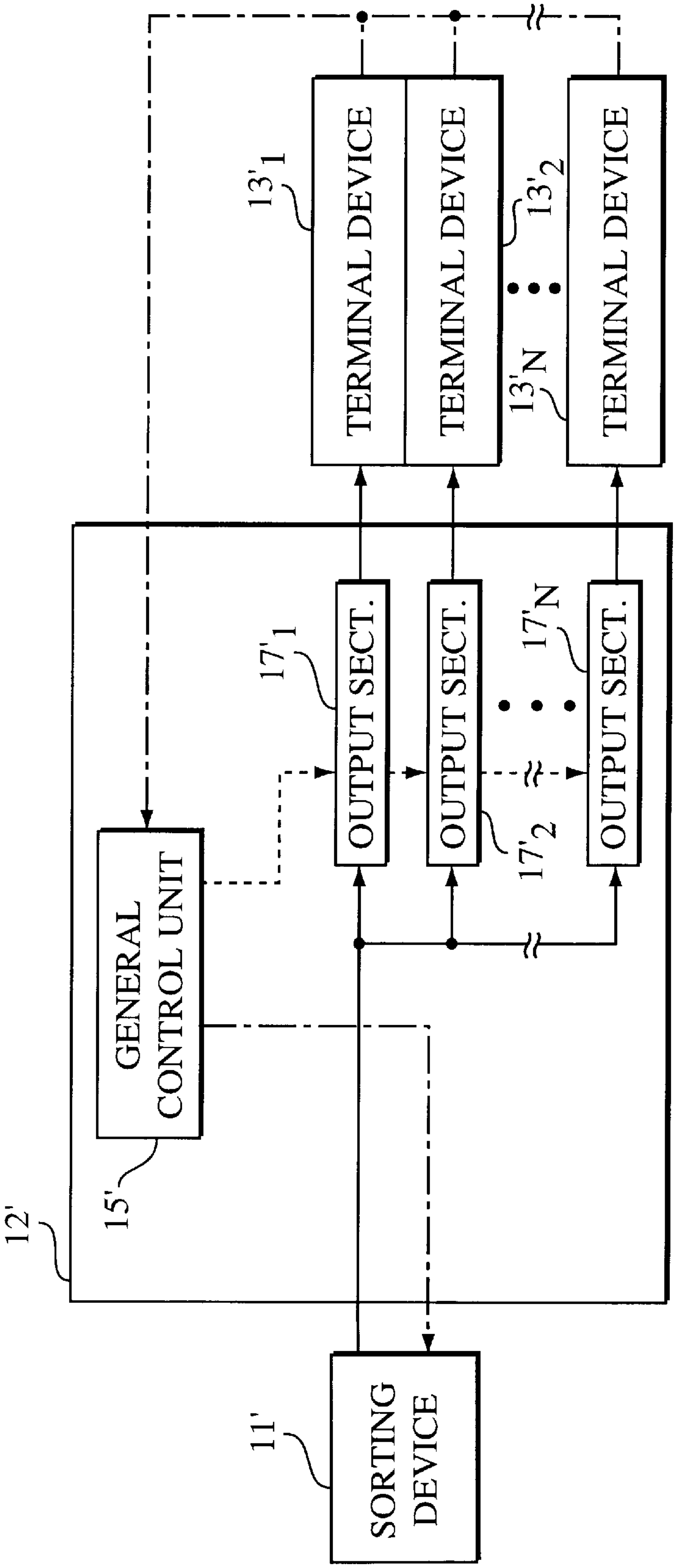
FIG. 1B PRIOR ART
Figure 2:
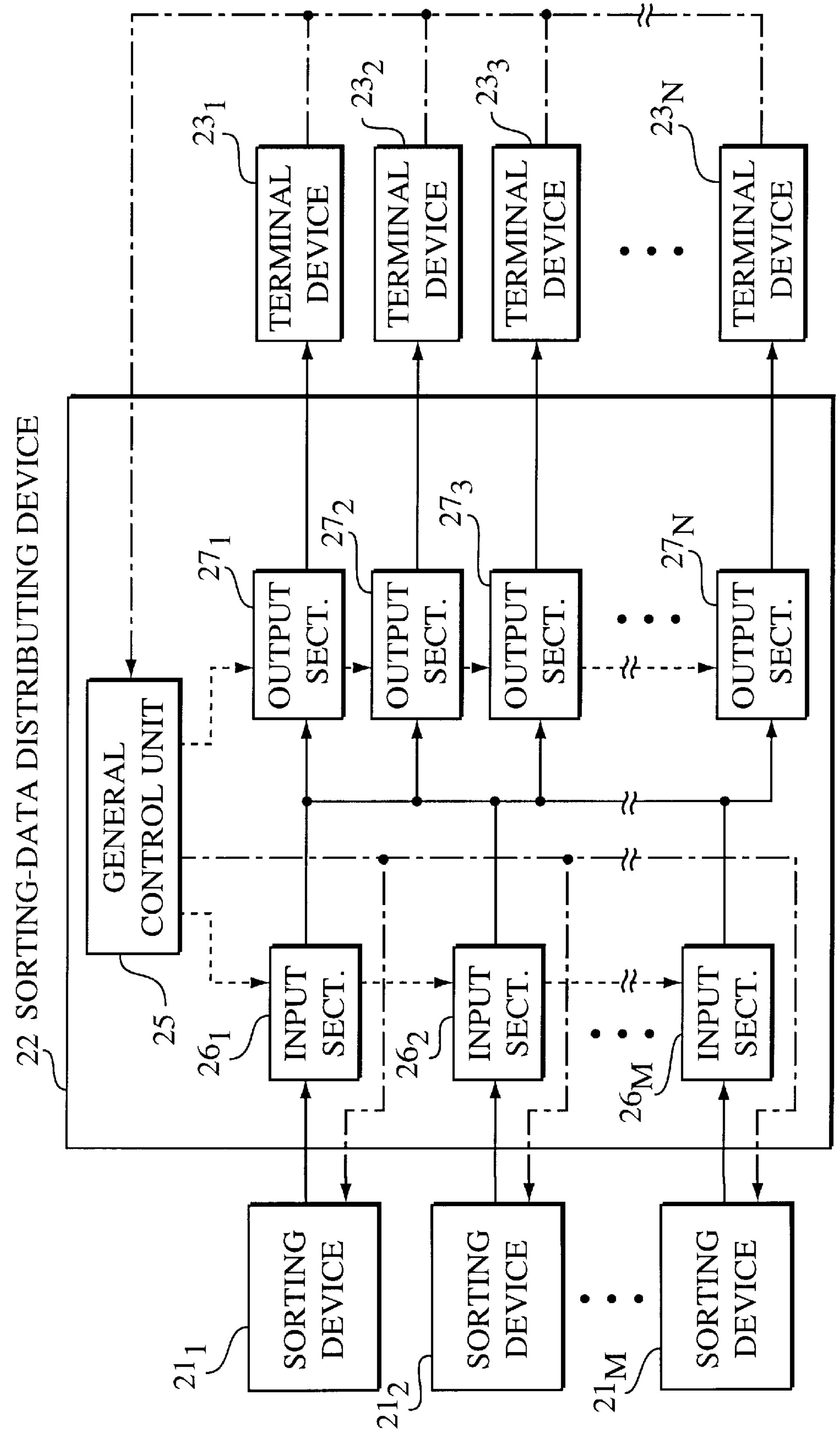
FIG. 2 is a block diagram illustrating an embodiment of an apparatus for entering sorting-information according to the present invention.

FIG. 2 is a block diagram illustrating an embodiment of an apparatus for entering sorting-information according to the present invention. The figure shows an arrangement including M sorting devices $\mathbf{21}_1$, $\mathbf{21}_2$, . . . $\mathbf{21}_M$ and N terminal devices for entering sorting data $\mathbf{23}_1$, $\mathbf{23}_2$, . . . $\mathbf{23}_N$.

Referring to FIG. 2, the apparatus for entering sorting-information includes sorting devices $\mathbf{21}_1$ to $\mathbf{21}_M$, sorting-data distributing device 22, and terminal devices for entering sorting-data $\mathbf{23}_1$ to $\mathbf{23}_N$. Sorting-data distributing device 22 includes general control unit 25, input sections $\mathbf{26}_1$ to $\mathbf{26}_M$ corresponding to sorting devices $\mathbf{21}_1$ to $\mathbf{21}_M$, respectively, and output sections $\mathbf{27}_1$ to $\mathbf{27}_N$ corresponding to terminal devices for entering sorting-data $\mathbf{23}_1$ to $\mathbf{23}_N$, respectively.

Sorting devices $\mathbf{21}_1$ to $\mathbf{21}_M$ perform photoelectric conversion of characters, figures, photographs and so forth marked on documents such as mail or securities supplied thereto. Sorting devices $\mathbf{21}_1$ to $\mathbf{21}_M$ then electronically recognize image information from the result of the photoelectric conversion and sort the documents using the recognized image information as sorting information.

When image information is unrecognizable, the image data is sent to sorting-data distributing device 22.

Sorting-data distributing device 22 receives, at input sections $\mathbf{26}_1$ to $\mathbf{26}_M$ thereof, unrecognized image data (unrecognized sorting data) from sorting devices $\mathbf{21}_1$ to $\mathbf{21}_M$ and distributes the image data to output sections $\mathbf{27}_1$ to $\mathbf{27}_N$ in order to supply the image data to terminal devices for entering sorting-data $\mathbf{23}_1$ to $\mathbf{23}_N$.

In this event, one of output sections $\mathbf{27}_1$ to $\mathbf{27}_N$ is selected under control of general control unit 25. The control is executed so that it selects the one of output sections $27_1$ to $27_N$ that is connected to the terminal device $23_L$ with the lowest load is selected. In this way, the unrecognized image data is directed to the terminal device $23_L$ with the lowest load.

When a plurality of sorting devices among the sorting devices $21_1$ to $21_M$ simultaneously provide unrecognized image data as outputs, the order in which the input sections supply the image data to the output sections is selected under the control of general control unit 25.

Each of terminal devices for entering sorting-data $23_1$ . . . $23_N$ has an image display unit or the like (not shown) and displays the image data supplied from sorting-data distributing device 22. Recognition (an operation to identify the correct sorting information from a faulty sorting image) is manually performed, and the recognized sorting data is entered into the terminal device.

The sorting information, i.e., the recognized sorting data, manually entered into one of terminal devices $23_1$ to $23_N$ is fed back via general control unit 25 to the sorting device $21_k$ which had originally supplied the unrecognizable sorting data (a faulty image data) to sorting-data distributing device 22. The document marked with the unrecognizable sorting data is then sorted based on the fed-back reccognized sorting data in the sorting device $21_k$.

A method by which general control unit 25 selects one of terminal devices $23_1$ to $23_N$ with the lowest load will be described below.

When a recognized sorting data has been entered into a terminal device by an operator, the recognized sorting data is sent to general control unit 25 in order to return the recognized sorting data to the sorting device which had originally supplied the unrecognizable image data.

In this event, the reception of the sorting information from a given terminal device serves at the same time as a request from that same terminal device for the input of more unrecognizable image information. Accordingly, general control unit 25, upon reception of the recognized sorting data, recognizes the input request having been issued by the given terminal device. General control unit 25 also recognizes that the given terminal device of concern currently have a lowered load as a result of having finished processing of the previous unrecognized image data.

In this way, the next unrecognized image data can be allotted to the terminal device having the lower load, and thus the loads on terminal devices $23_1$ to $23_N$ can be controlled so as to be even.

As an additional remark, there is not necessarily any need to employ the recognized sorting data as the request from the terminal device for the input of the next image data to the general control unit 25. It is possible, aside from the sorting data, for the terminal device to send a seperate input request signal from a terminal device to the general control unit 25.

Operation of the sorting-information entering apparatus shown in FIG. 2 will be described below in more detail. Referring to FIG. 2, documents are supplied to sorting devices $21_1$ . . . $21_M$, by which sorting image information is electronically recognized and sorted. Then, only image information which is unrecognizable by the sorting devices $21_1$ . . . $21_M$ is supplied to sorting-data distributing device 22.

For simplicity, we assume that unrecognizable sorting data is supplied from sorting device $21_1$ to sorting-data distributing device 22. In this case, general control unit selects the one of terminal devices $23_1$ . . . $23_N$ which has the lowest load, for example, terminal device $23_1$, and controls output section $27_1$ connected to terminal device $23_1$ to open.

Next, general control unit 25 controls input section $26_1$ connected to sorting device $21_1$ to open. Consequently, the image data which is unrecognizable at sorting device $21_1$ can be sent via input section $26_1$ and output section $27_1$ to terminal device $23_1$ with the lowest load.

Terminal device $23_1$ displays the image data, unrecognized by sorting device $21_1$, on an image display unit or the like so that an operator may recognize the sorting information. The operator enters the recognized sorting data into the terminal device $23_1$ which in turn sends the entered sorting data to sorting-data distributing device 22 (to general control unit 25).

Sorting-data distributing device 22 feeds back the recognized sorting data supplied from terminal device $23_1$ to sorting device $21_1$ via general control unit 25. The fed-back sorting data corresponds to the unrecognized sorting image data originally supplied from sorting device $21_1$ to sorting-data distributing device 22. Sorting device $21_1$ sorts the document, which is marked with the unrecognizable sorting image data, in accordance with the corresponding recognized sorting data.

Next, a further explanation of the operation of the sorting-information entering apparatus will be given with reference to FIG. 2 for the case in which unrecognizable sorting image data are supplied simultaneously from a plurality of sorting devices to sorting-data distributing device 22.

For simplicity, it is assumed that sorting devices $21_1$ and $21_2$ supply first and second unrecognized sorting data, respectively, to sorting-data distributing device 22.

In this case, sorting-data distributing device 22 first selects the terminal device with the lowest load, say $23_2$, from the terminal devices $23_1$ to $23_N$ that are in operation, regardless of which data is to be treated first. Assuming that terminal device $23_2$ has the lowest load at that time, sorting-data distributing device 22 next opens output section $27_2$ connected to the lowest-loaded terminal device $23_2$ under the control of general control unit 25.

At this stage of operation, the unrecognized sorting data from the sorting device $21_1$ is arbitrarily selected to be the first unrecognized sorting data. The second unrecognized sorting data supplied from sorting device $21_2$ is temporarily stored in input section $26_2$ connected to sorting device $21_2$, and transfer of the second sorting data to an output section $27_1$, . . . or $27_N$ is deferred. This deferment of the second image data ensures that the first unrecognized sorting data will be first treated.

Input section $26_1$ connected to sorting device $21_1$ is next opened under the control of general control unit 25, allowing first unrecognized sorting data to be sent to the lowest-loaded terminal device $23_2$ via input section $26_1$ and output section $27_2$.

Thereafter, sorting-data distributing device 22 closes both input section $26_1$ connected to sorting device $21_1$ and output section $27_2$ connected to terminal device $23_2$ under the control of general control unit 25.

Next, the terminal device with the next lowest load, for example, terminal device $23_3$, is selected and output section $27_3$ connected to terminal device $23_3$ is opened, both under the control of general control unit 25. Then, input section $26_2$ connected to sorting device $21_2$ is controlled to opened, allowing the second unrecognized sorting data which has been stored in input section $26_2$ to be sent to the next lowest-loaded terminal device $23_3$ via output section $27_3$.

Terminal devices $23_2$ and $23_3$ display the unrecognized sorting data on the image display units or the like so that an operator may recognize the sorting information. The operator enters his recognized sorting data into the terminal device from the keyboard. An operator's strike of the Enter key which indicates that the operater has finished inputting the sorting data causes the sorting data to be transmitted to sorting-data distributing device 22.

Sorting-data distributing device 22 classifies the received sorting data depending on the terminal device which has supplied the sorting data.

Sorting-data distributing device 22 sends the sorting data received from terminal devices $23_2$ and $23_3$ to sorting device $21_1$, and $21_2$, respectively, via general control unit 25, wherein sorting devices $21_1$ and $21_2$ are those sorting devices that have supplied the unrecognized sorting image data to terminal devices $23_2$ and $23_3$, respectively.

Sorting device then and sorting device $21_2$ sort the documents in accordance with the sorting data supplied from sorting-data distributing device 22.

In one aspect, the image-information entering system of the present invention is like a client-server system in that sorting devices $21_1 \ldots 21_M$, as client, request sorting data distributing device 22 and terminal devices $23_1 \ldots 23_N$, as server, to supply recognized sorting data.

However, the constitution of the system according to the present invention basically differs from an ordinary client-server system as described below:

Sorting-data distributing device 22 of the present invention is provided with the signal lines which transmit image signals from the sorting devices $21_1 \ldots 21_M$ (represented by solid lines in FIG. 2) and the signal lines which transmit sorting-information signals to the sorting devices $21_1 \ldots 21_M$ (represented by alternate long and short dash lines), separately. Sorting-data distributing device 22 is also provided with the signal lines which transmit image signals to terminal devices $23_1 \ldots 23_N$ (indicated by solid lines) and signal lines which transmit sorting image signals from terminal devices $23_1 \ldots 23_N$ (indicated by alternate long and short dash lines), separately. In other words, sorting-data distributing device 22 has input-signal lines and output-signal lines separately to communicate with sorting devices $21_1 \ldots 21_M$ as well as terminal devices $23_1 \ldots 23_N$. This allows sorting-data distributing device 22 to effect transmission and reception of signals at the same time. Further, the plurality of input sections $26_1 \ldots 26_M$ which receive image signals from sorting device $21_1 \ldots 21_M$ are independent of each other so that parallel operations can be effected. In addition, the plurality of output sections $27_1 \ldots 27_N$ which supply image signals to terminal devices $23_1 \ldots 23_N$ are also independent of each other. This enables parallel operations to be effected.

Furthermore, input sections $26_1 \ldots 26_M$ and output sections $27_1 \ldots 27_N$ are independent of each other and can effect parallel operations under the control of general control unit 25. Unlike ordinary servers, since all of the input sections and output sections of sorting-data distributing device 22 can effect parallel operations independently of each other as described above, the sorting-information entering apparatus can achieve high speed processing.

The present invention is summarized as described below.

The constitution of the apparatus for entering the sorting-information is characterized by a single sorting-data distributing device interposed between a plurality of the sorting devices and a plurality of the terminal devices for entering sorting data. By this constitution, each of the sorting devices and each of the terminal devices can be incorporated into the structure of the sorting apparatus for entering the sorting-information as devices that are independent of each other. As a result, even when the number of the sorting devices increases, an increase in the number of the terminal devices for entering sorting data can be held to a minimum. The constitution of the sorting-information entering apparatus further offers an advantage of easy addition or deletion of the sorting device and terminal devices, thereby allowing optimization of the system readily to be achieved.

Since all image information data which cannot be recognized by the sorting devices are managed by a single sorting-data distributing device and since the unrecognized sorting data can be sent from the single sorting-data distributing device preferentially to one of the terminal devices with a low load, any one of the sorting devices can communicate adaptively with any terminal device. Accordingly, even where the amounts of unrecognizable sorting data are uneven in the sorting devices, so that a load of one sorting device may be different from that of from other devices, it is possible to have loads of the terminal devices remain even.

It is to be understood, however, that although the characteristics and advantages of the present invention have been set forth foregoing description, the disclosure is illustrative only, and changes may be made in the within the scope of the appended claims.

What is claimed is:

1. An apparatus for entering sorting information, comprising:

a plurality of sorting devices each for photoelectrically recognizing sorting information of an image marked on a document and sorting the document using the recognized sorting information as sorting data and supplying unrecognized sorting information as unrecognized sorting data therefrom, a plurality of terminal devices for entering sorting data each for displaying a received unrecognized sorting data so that an operator may recognize the sorting information corresponding to the displayed unrecognized sorting data and for entering the sorting information recognized by the operator, as recognized sorting data, into the terminal device for entering sorting data of concern and transmitting the recognized sorting data therefrom, and a sorting-data distributing device connected between said plurality of sorting devices and said plurality of terminal devices for entering sorting data to receive and transfer said unrecognized sorting data to one of said plurality of the terminal devices for entering sorting data and also to receive said recognized sorting data transmitted from said terminal device for entering sorting data of concern and transfer the recognized sorting data to the sorting device which has supplied the unrecognized sorting data corresponding to the recognized sorting data, said sorting-data distributing device including a control unit, a plurality of input sections individually connected to said plurality of sorting devices, and a plurality of output sections individually connected to said plurality of terminal devices for entering sorting data, each of said plurality of input sections being connected with all of said plurality of output sections, wherein said control unit controls each of said input sections to receive said unrecognized sorting data, selects any one of said plurality of output sections to receive said unrecognized sorting data from said input section, and controls the selected output section to receive said unrecognized sorting data from said input section and transfer the unrecognized sorting data to the terminal device for entering sorting data connected to said selected output section.

2. A sorting-information entering apparatus according to claim 1, wherein said control unit selects, as said output section to receive said unrecognized sorting data, an output section connected to a terminal device for entering sorting data having a low load, and controls the selected output section to send the unrecognized sorting data to the terminal device for entering sorting data connected thereto.

3. A sorting-information entering apparatus according to claim 1, wherein, the transmission of said recognized sorting data from said terminal device for entering sorting data of concern to said sorting-data distributing device acts as an input request notifying said control unit that said terminal device for entering sorting data of concern is in a lower load state which is a waiting state for an input of the next unrecognized sorting data.

4. An apparatus for entering sorting information according to claim 1, wherein, a request for an input of the next unrecognized sorting data is transmitted to said control unit from said terminal device for entering sorting data of concern at the same time as the transmission of said recognized sorting data from said terminal device for entering sorting data of concern to said sorting-data distributing device.

5. An apparatus for entering sorting information according to claim 2, wherein, when a plurality of said unrecognized sorting data are supplied at the same time from a plurality of said sorting devices, unrecognized sorting data other than an unrecognized sorting data arbitrarily selected by said control unit are temporarily stored in the input sections individually connected to the sorting devices which have supplied the unrecognized sorting data other than the arbitrary selected unrecognized sorting data, and the arbitrary selected unrecognized sorting data is first sent to a lowest-loaded terminal device for entering sorting data under the control of said control unit, and thereafter other unrecognized sorting data are sent one by one to said terminal devices for entering sorting data in order from the lowest load level.

6. An apparatus for entering sorting information according to claim 2, wherein, when said recognized sorting data is sent from said terminal device for entering sorting data to said sorting device, the data is transmitted via said control unit.

7. An apparatus for according to claims 1, wherein signal paths of said unrecognized sorting data from said sorting devices to said terminal devices for entering sorting data are constructed separately from signal paths of said recognized sorting data from said terminal devices for entering sorting data to said sorting devices.

* * * * *